(12) United States Patent
Chai et al.

(10) Patent No.: US 10,104,135 B2
(45) Date of Patent: Oct. 16, 2018

(54) METHODS AND SYSTEMS FOR DRAG AND DROP CONTENT SHARING IN A MULTI-DEVICE ENVIRONMENT

(71) Applicant: OpenTV, Inc., San Francisco, CA (US)

(72) Inventors: Crx K. Chai, Oakland, CA (US); Alex Fishman, San Francisco, CA (US)

(73) Assignee: OPENTV, INC., San Francisco, CA (US)

(*) Notice: Subject to any disclaimer, the term of this patent is extended or adjusted under 35 U.S.C. 154(b) by 403 days.

(21) Appl. No.: 14/798,173

(22) Filed: Jul. 13, 2015

(65) Prior Publication Data

US 2015/0319202 A1 Nov. 5, 2015

Related U.S. Application Data

(63) Continuation of application No. 13/228,967, filed on Sep. 9, 2011, now Pat. No. 9,104,302.

(60) Provisional application No. 61/381,392, filed on Sep. 9, 2010.

(51) Int. Cl.
| | | |
|---|---|---|
| *G06F 3/0486* | (2013.01) | |
| *H04L 29/08* | (2006.01) | |
| *G06F 3/0481* | (2013.01) | |
| *H04L 29/06* | (2006.01) | |
| *G06F 9/54* | (2006.01) | |
| *G06F 9/455* | (2018.01) | |

(52) U.S. Cl.
CPC .......... *H04L 65/403* (2013.01); *G06F 3/0486* (2013.01); *G06F 3/04817* (2013.01); *G06F 9/542* (2013.01); *H04L 67/306* (2013.01); *G06F 9/45512* (2013.01)

(58) Field of Classification Search
CPC ..... H04L 65/403; H04L 67/306; G06F 9/542; G06F 9/45512; G06F 3/0486; G06F 3/04817
See application file for complete search history.

(56) References Cited

U.S. PATENT DOCUMENTS

| | | |
|---|---|---|
| 5,831,664 A | 11/1998 | Wharton et al. |
| 6,727,918 B1 | 4/2004 | Nason |
| 7,130,616 B2 | 10/2006 | Janik |
| 9,104,302 B2 | 8/2015 | Chai et al. |
| 2002/0131074 A1* | 9/2002 | Yamade .......... H04L 29/06 358/1.15 |
| 2002/0138843 A1 | 9/2002 | Samaan et al. |
| 2003/0236830 A1 | 12/2003 | Ortiz et al. |
| 2004/0044723 A1 | 3/2004 | Bell |
| 2004/0117845 A1 | 6/2004 | Karaoguz et al. |
| 2004/0253945 A1 | 12/2004 | Janik |

(Continued)

FOREIGN PATENT DOCUMENTS

AU 2011101160 9/2011

OTHER PUBLICATIONS

"U.S. Appl. No. 13/228,967, Examiner Interview Summary dated Aug. 12, 2014", 3 pgs.

(Continued)

*Primary Examiner* — Amy M Levy
(74) *Attorney, Agent, or Firm* — Schwegman Lundberg & Woessner, P.A.

(57) ABSTRACT

Methods and systems for interacting with graphical user interface elements to invoke commands and initiate requests in a multi-device environment are described.

15 Claims, 6 Drawing Sheets

(56) References Cited

U.S. PATENT DOCUMENTS

| | | | |
|---|---|---|---|
| 2005/0052685 A1 | 3/2005 | Herf et al. | |
| 2005/0183121 A1 | 8/2005 | Kim et al. | |
| 2005/0227678 A1* | 10/2005 | Agrawal | H04L 12/585 455/414.3 |
| 2005/0246636 A1* | 11/2005 | Blagsvedt | G06Q 10/10 715/700 |
| 2006/0026119 A1 | 2/2006 | Mirrashidi et al. | |
| 2006/0053389 A1* | 3/2006 | Michelman | G06F 9/4443 715/775 |
| 2006/0146765 A1* | 7/2006 | Van De Sluis | G06F 3/016 370/338 |
| 2007/0055944 A1 | 3/2007 | Rashid et al. | |
| 2007/0118801 A1 | 5/2007 | Harshbarger et al. | |
| 2007/0162938 A1 | 7/2007 | Bennett et al. | |
| 2007/0255742 A1 | 11/2007 | Perez et al. | |
| 2008/0155057 A1* | 6/2008 | Khedouri | G06F 17/30038 709/217 |
| 2008/0189293 A1 | 8/2008 | Strandel et al. | |
| 2008/0288499 A1 | 11/2008 | Choi et al. | |
| 2008/0305832 A1* | 12/2008 | Greenberg | H04W 8/18 455/557 |
| 2009/0172565 A1* | 7/2009 | Jackson | H04L 67/1095 715/753 |
| 2009/0276547 A1* | 11/2009 | Rosenblatt | G06F 17/30058 710/33 |
| 2009/0300139 A1* | 12/2009 | Shoemaker | G06Q 10/10 709/217 |
| 2009/0300511 A1* | 12/2009 | Behar | G06F 1/162 715/745 |
| 2010/0131844 A1 | 5/2010 | Wohlert | |
| 2010/0229243 A1 | 9/2010 | Lin et al. | |
| 2010/0299601 A1 | 11/2010 | Kaplan et al. | |
| 2010/0325549 A1 | 12/2010 | Gibson et al. | |
| 2011/0060994 A1 | 3/2011 | Maxwell et al. | |
| 2011/0225539 A1 | 9/2011 | Lee et al. | |
| 2011/0270923 A1* | 11/2011 | Jones | G06F 3/0421 709/204 |
| 2011/0271192 A1 | 11/2011 | Jones et al. | |
| 2012/0066602 A1 | 3/2012 | Chai et al. | |
| 2013/0007793 A1 | 1/2013 | Anthru et al. | |

OTHER PUBLICATIONS

"U.S. Appl. No. 13/228,967, Examiner Interview Summary dated Oct. 29, 2013", 4 pgs.

"U.S. Appl. No. 13/228,967, Examiner Interview Summary dated Dec. 17, 2014", 3 pgs.

"U.S. Appl. No. 13/228,967, Final Office Action dated Oct. 16, 2014", 15 pgs.

"U.S. Appl. No. 13/228,967, Final Office Action dated Dec. 9, 2013", 18 pgs.

"U.S. Appl. No. 13/228,967, Non Final Office Action dated Jun. 27, 2014", 20 pgs.

"U.S. Appl. No. 13/228,967, Non Final Office Action dated Jul. 29, 2013", 17 pgs.

"U.S. Appl. No. 13/228,967, Notice of Allowance dated May 14, 2015", 7 pgs.

"U.S. Appl. No. 13/228,967, Preliminary Amendment dated Sep. 13, 2011", 10 pgs.

"U.S. Appl. No. 13/228,967, Response filed Mar. 7, 2014 to Final Office Action dated Dec. 9, 2013", 22 pgs.

"U.S. Appl. No. 13/228,967, Response filed Sep. 17, 2014 to Non Final Office Action dated Jun. 27, 2014", 13 pgs.

"U.S. Appl. No. 13/228,967, Response filed Jan. 12, 2015 to Final Office Action dated Oct. 16, 2014", 13 pgs.

"U.S. Appl. No. 13/228,967, Response filed Oct. 29, 2013 to Non Final Office Action dated Jul. 29, 2013", 15 pgs.

Donnell, Wendy, "Set-Top Box Shoot Out", [Online]. Retrieved from the Internet: <URL: http://www.pcmag.com, (Jan. 24, 2011).

Hansell, Saul, "ZillionTV:Another Set-Top Box, With Ads", [Online]. Retrieved from the Internet: <URL: http://bits.blogs.nytimes.com, (Mar. 4, 2009).

Nintendo, "Animal Crossing:City Folk", [Online]. Retrieved from Internet: <http://animal-crossing.com/cityfolk>, (Oct. 23, 2013), 10 pgs.

Tweney, "How to send and receive mobile phone SMS messages", Web Blog Post, (c) 2006, [Online]. Retrieved from the Internet: <URL: http://tinyword.com/about-old/mobile/>, (Jul. 13, 2013), 2 pgs.

\* cited by examiner

METHODS AND SYSTEMS FOR DRAG AND DROP CONTENT SHARING IN A MULTI-DEVICE ENVIRONMENT

RELATED APPLICATIONS

This patent application is a continuation of U.S. patent application Ser. No. 13/228,967, filed Sep. 9, 2011, which claims the benefit of priority, under 35 U.S.C. § 119(e), to U.S. Provisional Patent Application Ser. No. 61/381,392, filed on Sep. 9, 2010, which is incorporated herein by reference in its entirety.

TECHNICAL FIELD

The present disclosure generally relates to digital media content systems and applications. More specifically, the present disclosure relates to methods and systems for interacting with graphical user interface elements to invoke commands and initiate requests in a multi-device environment.

BACKGROUND

With the increasing popularity of powerful, full-featured, mobile computing devices, including smart phones, tablet computers, and personal media players, and the merging of networked computers and large screen displays (e.g., television monitors), content consumers have increasingly complex choices when it comes to how and when they consume digital media content. Moreover, the number and types of content sources have increased significantly as well. For example, content consumers generally have a choice for television programming between over-the-air programming, cable television programming, satellite broadcast programming, and even Internet, or IPTV (Internet Protocol) programming. Additionally, the World Wide Web continues to expand its video capabilities with ever-expanding options for rich video content.

DESCRIPTION OF THE DRAWINGS

Some embodiments are illustrated by way of example and not limitation in the figures of the accompanying drawings, in which.

DETAILED DESCRIPTION

Methods and systems for interacting with graphical user interface elements to invoke commands and initiate requests in a multi-device environment are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

For purposes of the present disclosure, the term "mobile computing device" is meant to include mobile phones (frequently referred to as smart phones) as well as other general purpose or application specific computing devices that include wireless data networking functionality, with or without voice-based phone functionality, such as certain tablet computing devices and portable media player devices. Skilled artisans will immediately recognize that certain mobile computing devices, such as iPhone®, iPod® and iPad® devices, developed by and available from Apple Corporation of Cupertino, Calif., as well as any one of a wide variety of devices based on the Android™ operating system developed by Google, Inc. of Mountain View, Calif., fall within the intended definition of a mobile computing device. A great number of other mobile computing devices, with other operating systems, will also be applicable to the inventive subject matter, which is described at length below in connection with the description of the various figures.

Consistent with some example embodiments, a digital content browsing and viewing application resides and executes on a mobile computing device that has a touch screen display. The graphical user interface (GUI) of the content browsing and viewing application (hereinafter, "the content viewing application") includes various graphical user interface elements. For instance, the content viewing application will generally include one or more content or video windows in which content is displayed and/or video is presented. In addition, the content viewing application includes icons that are representative of content and other real-world entities, including networked hardware devices, and/or individual friends, family members and groups of people. The mobile computing device includes a data communications module and/or network interface that facilitates the exchange of data with other networked hardware devices over any number of data communication channels, including local area networks (LANs) and wide area networks (WANs). For instance, consistent with one example embodiment, the mobile computing device includes a WiFi® network connection (e.g., IEEE 802.11) to a set top box, which may be connected to a large screen display. In addition, with some example embodiments, the mobile computing device includes the necessary radio transceiver and support for communication protocols for communicating data over various wide area networks (WANs), such as conventional GSM, LTE, WiMAX (e.g., IEEE 802.16), or other mobile data networks. Accordingly, the mobile computing device may communicate with a set top box over a WAN even when the mobile computing device is not in the same geographical location as the set top box, thereby enabling geographically remote control over certain functionality. Within this environment of networked devices, a user can quickly and easily perform a variety of operations by simply manipulating a graphical user interface element on the touch screen display of the mobile computing device, as described in greater detail below.

For instance, consistent with one example embodiment, a user may press and hold his finger on a first GUI element displayed on the touch screen device, such as a content or video window, while dragging, or otherwise moving his finger to "pull" the first GUI element and then lift his finger as if to "drop" the element on top of a second GUI element such manipulation commonly referred to as a "drag-and-drop" operation. By dragging and dropping a first GUI element over the top of a second GUI element, the user can invoke a wide variety of operations that intuitively make sense to the user based on what the various GUI elements represent. For instance, in some example embodiments, dragging and dropping a content or video window over a GUI element representing a person, or group of people (such as the case may be with a buddy list) may automatically invoke an operation to share the content or video currently being displayed or presented in the content or video window of the content viewing application executing on the mobile computing device, with a particular person associated with the second GUI element. More precisely, the currently displayed content or video may be shared with a particular hardware device associated with (e.g., owned by) the person associated with second GUI element.

In yet another example, the user of the content viewing application may drag and drop a content or video window over a second GUI element (e.g., icon) representing a separate hardware device, such as a large screen display, a digital video recorder, or desktop computer. Depending upon the configuration settings or profile associated with each individual icon, the operation that is invoked by dragging and dropping the content or video window may vary. For instance, an icon representing a large screen display may have a profile with configuration settings that allow the icon to be configured such that, when a user "drops" a content or video window on the icon for the large screen display, the content or video currently being displayed or presented in the content or video window of the mobile computing device is automatically displayed or presented on the large screen display. Similarly, an icon for a digital video recorder (DVR) may be configured such that dropping a content or video window on the icon for the DVR automatically schedules a recording of the content or video being displayed or presented via the content viewing application executing on the mobile computing device.

Consistent with some embodiments, the various GUI elements that represent hardware devices, or persons on a buddy list, will have or be associated with profiles consisting of easily manipulated configuration settings that enable the user, or an administrator, to quickly and easily define the operations that are to occur when certain GUI elements are "dropped" on the representative icons. For instance, an icon for a set top box may be configured to invoke a variety of operations when a user drops a content or video window on the respective icon. The profile of the set top box icon may be configured to invoke a command to schedule a recording of the video being presented in a video window of the content video window. Alternatively, the profile of the set top box icon may be configured to invoke a command to automatically display or otherwise present the content or video that is dragged onto the set top box icon. With some embodiments, a single default operation is defined to occur when a video or content window is dropped on a GUI element. However, as described in more detail below, with some example embodiments, a list or menu of selectable operations may be displayed when a video or content window is dropped on a particular GUI element or icon.

For instance, consistent with some example embodiments, various icons representative of networked hardware components or people may be configured to display a pop-up list or menu of possible operations when a content or video window, or another GUI element representative of some content, is dragged and dropped onto the icon. For instance, when a GUI element representative of some content is dropped on a set top box icon, a menu may be displayed allowing the user to select whether the content is to be recorded for subsequent viewing, or whether the content is to be instantly displayed or presented on a large screen display connected to the set top box. Of course, icons for other devices may be associated with a wide variety of other functions that are supported by the various hardware devices being represented by the icons. As such, the list of operations that is displayed for a particular icon will vary based on the functionality of the hardware device represented by the icon. With some embodiments, icons may be displayed to represent separate functions of the same hardware device. For example, a set top box may have a first icon representing a digital video recording (DVR) capability, such that when a content item is dropped onto the icon, a DVR functionality is automatically invoked. In addition, the set top box may be connected to a large display, and therefore may have a separate icon representing the display. When a content item is dropped on this icon, the default operation that is invoked may cause the respective content to be automatically presented or displayed via the display connected to the set top box.

As described in greater detail below, when the content viewing application residing and executing on the mobile computing device detects that an operation has been invoked by a drag and drop action, the content viewing application generates one or more commands based on configuration settings for the relevant GUI elements, and communicates the commands over a network to the relevant hardware devices. For instance, if a user drags and drops a GUI element representative of content onto an icon representative of a person in a buddy list for the purpose of sharing the content with the person, the content viewing application analyzes the configuration settings of the target icon (e.g., the icon representative of the person), generates a command that identifies the relevant content (e.g., with a content identifier) and communicates the command over a network to a networked hardware device associated with the target icon. In some example embodiments, the command may be communicated over a network directly to a remote set top box of the person associated with the icon in the buddy list (i.e., the person with whom the content is being shared). Alternatively, with some example embodiments, the command may be communicated directly to a local set top box, or to a content management server, either one of which will process the command and communicate a subsequent command to the appropriate hardware device of the person with whom the content is being shared.

Consistent with some example embodiments, the various hardware devices that can be controlled, or with which content can be shared, will each include a software module for receiving, transmitting, processing and/or interpreting commands that may be generated via another compatible networked device. Moreover, with some embodiments, the mobile computing device may invoke commands over a wide area network (e.g., such as the Internet), using a mobile data connection (e.g., GSM, LTE or WiMAX). Accordingly, a user of the content viewing application on the mobile computing device may share content even when the user is away from his set top box, and remotely schedule a recording on a compatible set top box or DVR device. Furthermore, the content that can be shared may be content that is directly communicated to the mobile computing device, such as the case may be with a web page, or web-based video and audio streaming content. Alternatively, the content that may be shared via the content viewing application may be received at the mobile computing device directly from a set top box, which in turn receives the content from a centralized content provider with which the user has subscribed (such as a cable, satellite or Internet service or programming provider).

Figure 1:
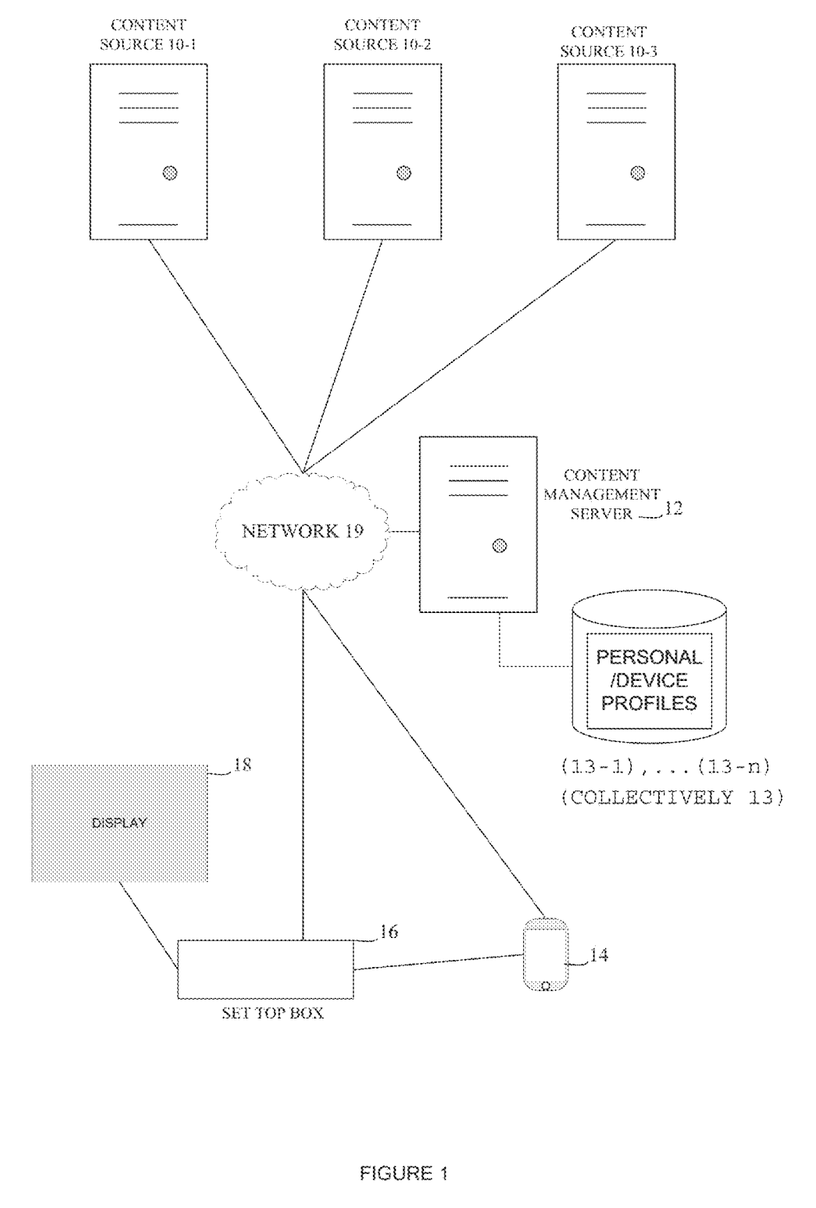
FIG. 1 illustrates an example of a network environment having several content sources (e.g., servers) connected to a content management server and several devices for use in consuming content, consistent with some example embodiments.

FIG. 1 illustrates an example of a network environment having several content sources (e.g., content servers 10-1, 10-2 and 10-3) connected to a central content management server 12 and several devices for use in consuming content, including a mobile computing device 14, a set top box 16 and a large screen display 18. By way of example, as illustrated in FIG. 1, the mobile computing device 14 is executing a content viewing application. Consistent with some example embodiments, the content viewing application is capable of receiving and displaying content from a wide variety of content sources. For example, the content viewing application may include a video player module capable of processing and playing video content received directly over a network from a content source (e.g., content source 14-1), a content management server 12, or directly from another networked device, such as a set top box 16.

In some example embodiments, the set top box 16 may be configured to receive content via a cable, satellite or Internet programming provider. As such, the content management server 12 may receive, process, aggregate and distribute content from a wide variety of content providers. This content may be communicated first to the set top box, and then over a LAN or WAN to the mobile computing device for display via the content viewing application. Accordingly, with some example embodiments, the content viewing application on the mobile computing device is configured to browse and view content directly from the set top box 16. In addition, the content viewing application may include web browsing functionality, enabling a user to browse web content and view video content delivered via the World Wide Web. The content viewing application may also include a media player module capable of processing and displaying content from one or more video on demand sources. In general, the content viewing application 12 is designed to process and present (e.g., display or playback) a wide variety of content, to include web content, video content and audio content.

Although FIG. 1 shows a single network cloud, the network cloud may consist of several interconnected networks, including wired and wireless networks, public and private networks, conventional Internet Protocol (IP) networks as well as mobile data networks and/or packet based networks. At any given time, the mobile computing device may be connected to one or more devices, such as the set top box 16, via a home network of the user, as well as a WAN.

Consistent with some embodiments of the invention, a buddy list or other type of social network may be facilitated by the content management server 12. For instance, all subscribers to the content provider operating the content management server 12 may be provided with a personal username or other personal identifier. The content management server 12 may include a web server, enabling users to specify other friends and family members, and define groups of people, that are arranged and organized into a buddy list. In some embodiments, the buddy list may be accessed and managed via the set top box (e.g., via the display connected to the set top box), via the content viewing application executing on the mobile computing device, or from a conventional web browser executing on another computing device (not shown). The buddy list may be centralized and managed via the content management server, or in some instances, a third party service, such that changes and modifications made from any device will automatically be reflected in all other devices.

With some embodiments, the content management server 12 includes personal and/or device profiles 13 that reflect various user preferences and/or device capabilities. Accordingly, with some embodiments, commands that are generated for sharing content may be communicated to the content management server and processed in accordance with various preferences defined by the personal profile (e.g., profile 13-1) of the person with whom the content is being shared. For example, a subscriber may configure his personal profile profile 13-1) to indicate a device (e.g., a mobile phone) where alerts and notifications should be communicated, when content is received from other subscribers. Accordingly, when a user of the content viewing application drags and drops a content icon (representative of some content) onto a buddy list icon, with some embodiments, a command may be communicated to the content management server (either directly via a WAN, or indirectly through the set top box connected via a LAN). The command may identify the target (e.g., the person with whom the content is being shared) by his or her subscriber ID, email, username or some other identifying mechanism. In addition, the command may identify the content being shared by a content identifier. The content management server will then analyze the received command, including the identifying mechanism for the target user. The content management server will then process the command in accordance with the personal profile and/or a device profile of the target user (e.g., profile 13-2). If, for example, the target user has blocked content sharing from a particular user, the content management server may notify the user who has attempted to share the content without further processing the command. Similarly, if the target user has requested that a message (e.g., email, SMS, instant message, or similar) be directed to a particular device when a content sharing request is processed, the content management server may generate and transmit the appropriate message.

Figure 2:
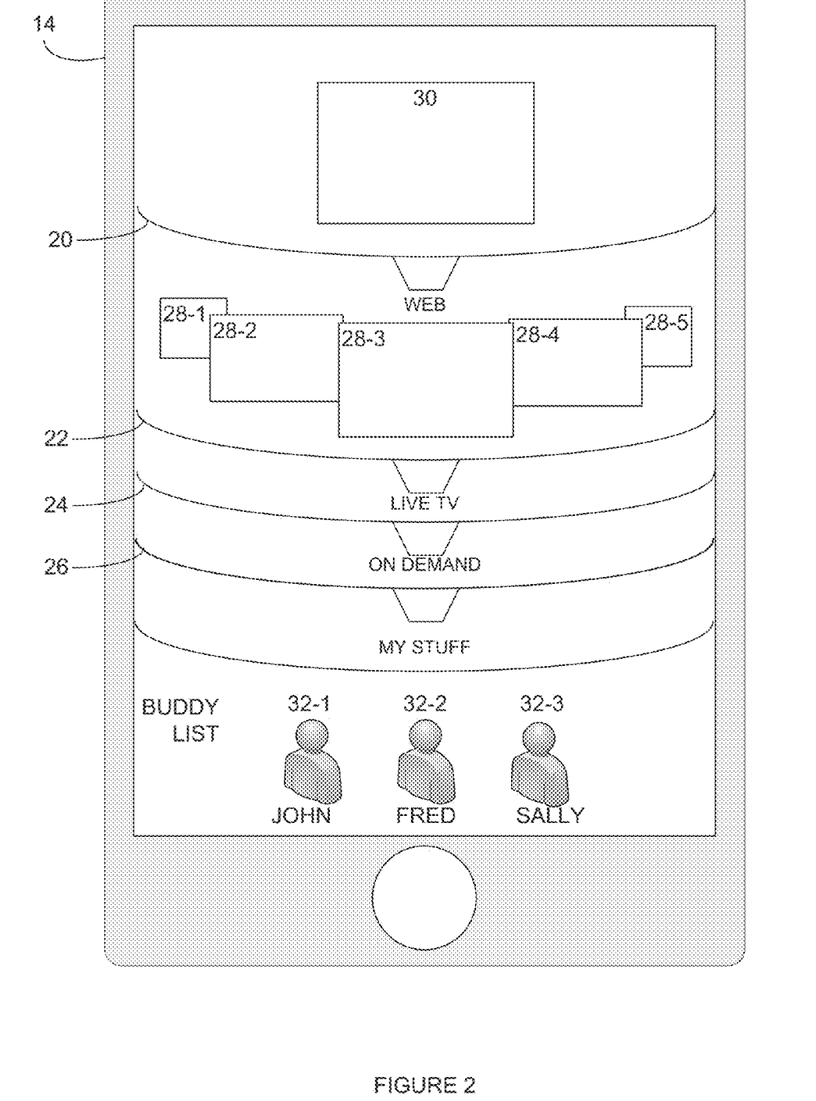
FIGS. 2, 3 and 4 illustrate various example user interfaces for a mobile or tablet-based application, consistent with some example embodiments.
Figure 3:
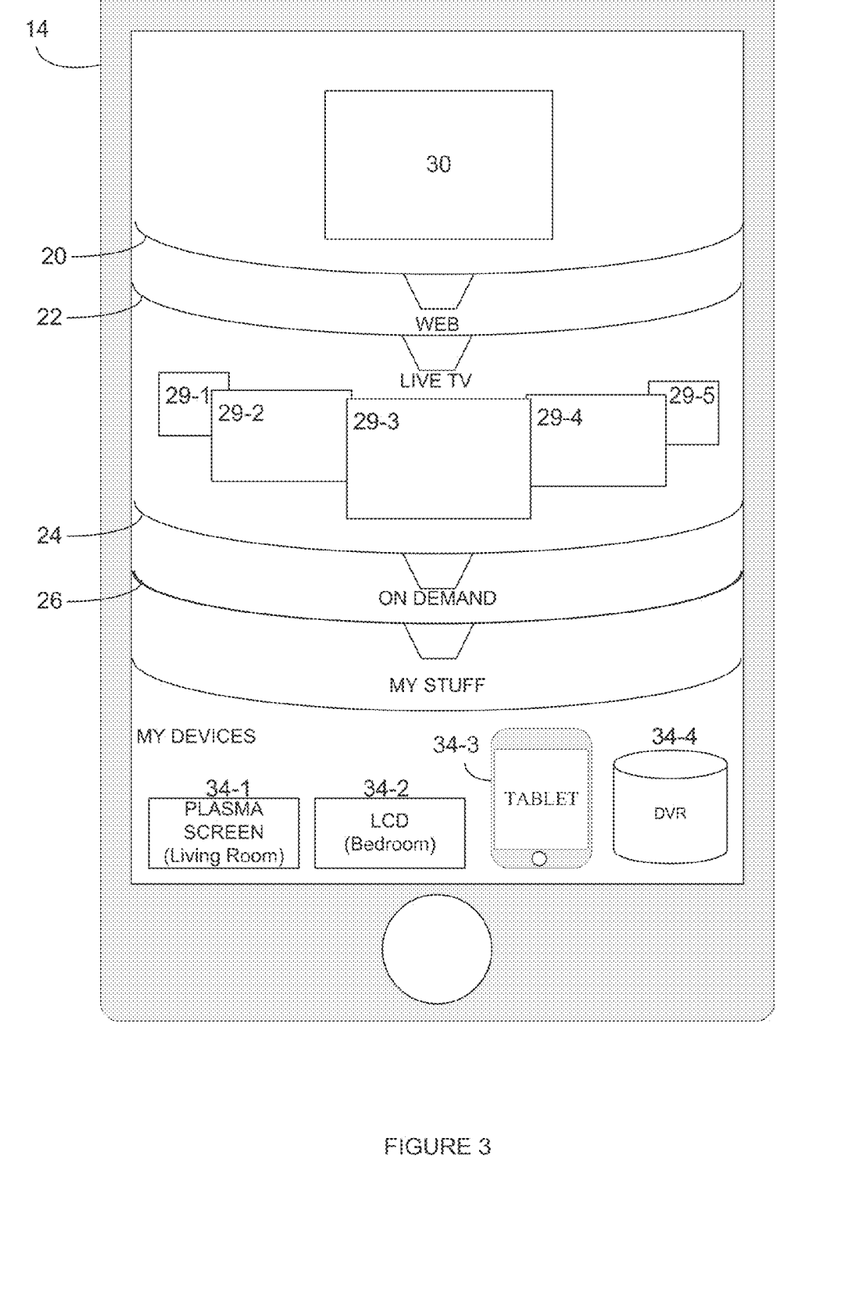
Figure 4:
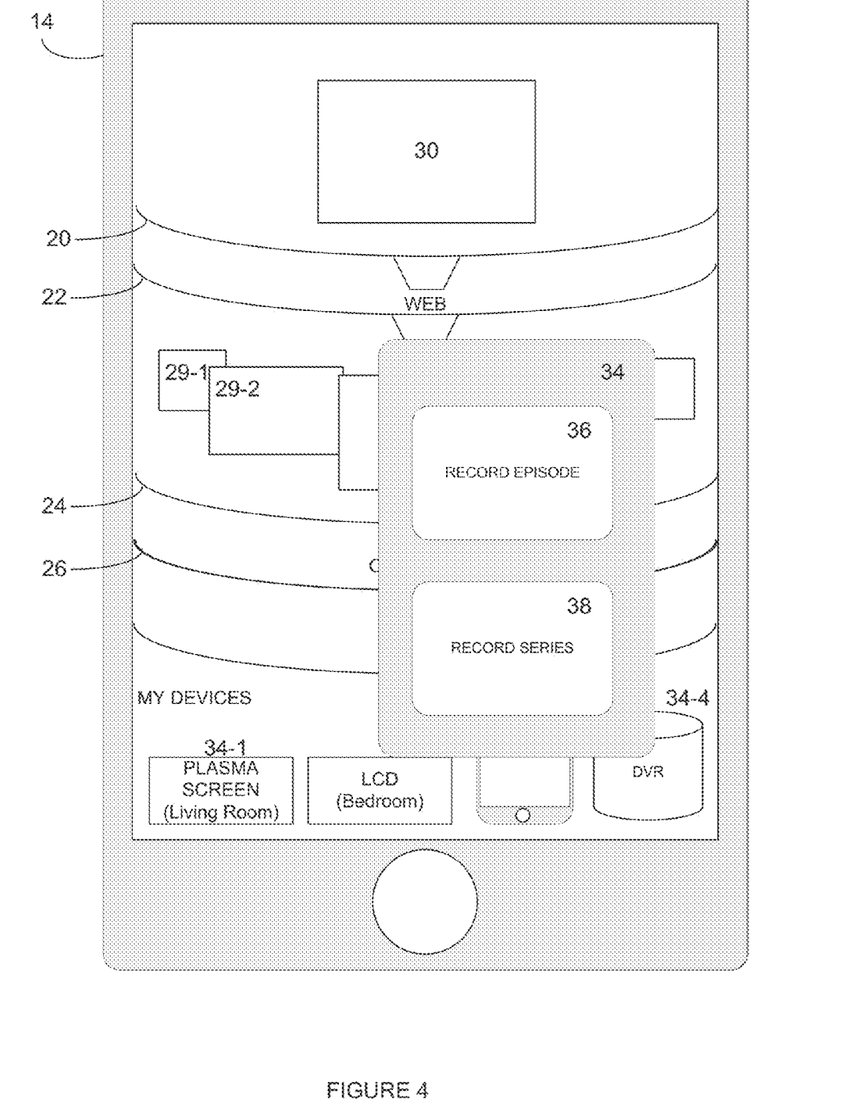

FIG. 2 illustrates an example user interface for a mobile or tablet-based content viewing application, consistent with some example embodiments. It will be immediately apparent to skilled artisans that the example embodiments shown in FIGS. 2, 3 and 4 are meant to convey a general understanding of the various functionality involved. A wide variety of alternative UI designs and mobile computing device form factors are within the general bounds of the inventive concepts described herein. As illustrated in FIG. 2, the content is organized around the concept of a content arc, of which there are four—content arcs 20, 22, 24, and 26. In particular, there are content arcs for web content 20, live TV programming 22, on demand programming 24 and a content category referred to as "My Stuff". At any given time, one of the four content arcs can be active, such that content associated with that particular category can be browsed. For instance, as illustrated in FIG. 2, the web content arc 20 is the active arc, and various content windows 28-1, 28-2, 28-3, 28-4 and 28-5 are shown in what is referred to herein as a content carousel. Each content window may represent a video, or other content, accessible via a content source on the World Wide Web. By swiping a finger to the left or to the right over the web content arc 20, the user can quickly rotate through a vast selection of available web content. With some embodiments, one or more of the content windows comprising the content carousel may display dynamic content (e.g., video being played).

In addition to the various content windows 28 shown within the web content arc 20, an active content or video window 30 is shown at the top of the displayed user interface. If a user selects a content window from the web content arc 20 (e.g., by pressing on the content window), the selected content window becomes the active window 30. Accordingly, whatever content is associated with a particular selected content window will be presented or displayed in the active content window 30. This enables a user to browse a wide variety of content while simultaneously viewing the active content in the active content window 30. For instance, a user may be viewing a live television program in the active window 30, while browsing for web content via the web content arc 20.

At the bottom of the user interface there is shown a buddy list with three icons representing three persons in the buddy list—for example, John 32-1, Fred 32-2 and Sally 32-3. If a user of the content viewing application desires to share a content item represented by any visible content or video window (e.g., content windows 28-1, 28-2, 28-3, 28-4, 28-5 or 30), the user can simply press on the content window, and then move his or her finger (e.g., dragging or pulling) the content window over a particular buddy with whom the user would like to share the content. When this occurs, the content viewing application detects the drag and drop action, invokes an operation to generate a command in accordance with the particular profile (e.g., profile 13-1) or configuration settings of the respective target icon and content or video window, and directs the command to an appropriate hardware device for further processing.

By way of example, consider the case where the user has dragged the active content window 30 to the icon 32-1 representing the user's friend, John. When the content viewing application detects the drag and drop action, the content viewing application will generate a command in accordance with the profile 13-1 or configuration settings for the icon 32-1 for John. In some embodiments, the configuration settings for the icon 32-1 are locally stored at the mobile computing device 14. The configuration settings for the icon 32-1 will specify how the sharing operation is to occur, and thereby affect the resulting command that is to be generated. First, the configuration settings may indicate the type of operation that is to occur for the icon 32-1. For example, given that the icon represents a friend, the operation type may indicate a sharing operation. The configuration settings for the icon 32-1 may specify other instructions for how the sharing operation is to occur. For instance, the configuration settings may indicate that an actual copy of the content is to be communicated to a particular device owned by John, such as his set top box. Alternatively, the configuration settings for the icon may indicate that a link or other type of pointer, such as a content identifier and/or content source identifier be communicated to one of John's devices, such that John will be able to automatically retrieve a copy of the shared content at a time and location of John's choosing. As such, the various configuration settings for the icon may control what is shared (e.g., actual content, or a link to content), and to what specific device the content is to be directed (e.g., John's set top box, mobile phone, tablet computer, etc.).

With some embodiments, the icon 32-1 may not have any associated configuration settings residing locally at the mobile computing device. Consequently, the user of the mobile computing device may have less control over the sharing operation. Instead, the generated sharing command that results from the drag and drop action may be automatically directed to a local set top box, or a centralized content management server, where the command is further processed in accordance with preferences established by John. For instance, with some embodiments, John may establish various preferences as part of a personal and/or device profile 13-1 that indicate how content sharing requests/commands are to be handled. For example, John may specify that all shared content is to be immediately loaded to his set top box, and an alert or notification is to be sent to his mobile device to alert him of the shared content. Alternatively, John may specify that only a link or address where the content can be accessed is to be communicated to his tablet computer, or desktop computer, and so on. As such, with some embodiments, John can control how content sharing occurs by specifying various preferences that are part of a personal user profile, or device profile (e.g., profile 13-1).

In yet another example embodiment, the configuration settings associated with a particular icon (e.g., profile 13-1 which may be associated with Icon 32-1 for buddy, John, in FIG. 2) may be stored on the set top box 16. Accordingly, when a drag and drop action is detected, a command may be routed to the network-connected set top box, which will further process the sharing command in accordance with configuration settings associated with the icon that is representative of John. In this way, multiple devices (e.g., mobile computing devices, laptop computer, desktop computer, etc.) may all utilize the centrally located configuration settings for different icons residing at the set top box. In yet other example embodiments, certain preferences or configuration settings may be locally established, for example, with a profile (e.g., profile 13-1) associated with the icon stored at the mobile computing device, while other preferences or configuration settings are stored centrally, either at the content management server 12 or the set top box 16. As such, with some embodiments, certain aspects of the sharing operation may be controlled or managed by the person sharing the content, while other aspects of the sharing operation may be under the control of the person with whom the content is being shared.

FIG. 3 illustrates an example user interface for a mobile or tablet-based content viewing application, consistent with some example embodiments. The example user interface in FIG. 3 is much like the one presented in FIG. 2, however, the active content arc in FIG. 3 is the "Live TV" arc 22. As with the web content arc 20, a swiping gesture (finger to the left or right) over the video content carousel (e.g., video windows 29-1, 29-2, 29-3, 29-4 and 29-5) results in a dynamic rotating display of available video content from a live television programming source, such as set top box 16. As illustrated in FIG. 3, a set of selectable icons is shown at the bottom of the example user interface, with label, "My Devices". Consistent with an example embodiment, any number of operations may be invoked by simply dragging content items, such as anyone of content or video windows 29-1, 29-2, 29-3, 29-4, 29-5 or 30 to an icon in the list of devices.

By way of example, consider the case when a user drags and drops the active video window 30 onto the icon 34-1 representing the plasma screen in the living room. By default, the icon may be configured to invoke a command that results in the content being presented in the active video window to automatically be presented on the plasma screen. For instance, when the content viewing application detects the drag and drop action, the content application may generate a command with the relevant content identifier, and communicate the command to the appropriate device, requesting that the device display the content on the plasma screen. In some cases, the appropriate device may be the plasma screen itself, assuming that it has built-in networking, channel tuning, and computer processing capabilities. In other instances, the command may be directed to a set top box to which the plasma screen is connected. The set top box, upon receiving the command, will process the command to tune the correct channel, and output the correct signal on the output to which the plasma screen is connected.

In another example, consider the case when a user drags and drops the active video window onto the icon representing the DVR 34-4. By default, the content viewing application may invoke a command to have the DVR, record the content that is being presented in the active video window. As described in connection with FIG. 4, in some instances, an additional user interface element may be displayed when the drag and drop action is detected. For example, the additional user interface element may simply be a pop-up or text box that describes the operation that has been invoked, and requests that the user press a virtual button to confirm that the operation is to be executed. Alternatively, the additional user interface element may provide a list of operations that can be invoked, as described in connection with FIG. 4.

FIG. 4 illustrates an example user interface for a mobile or tablet-based content viewing application, consistent with some example embodiments. Referring again to the example where a user drags and drops the active content window 30 onto the icon representing the MR, in response to detecting such a drag and drop action, the content viewing application may present an additional user interface element, such as the text box 34 shown in FIG. 4. The text box 34 presents the user with two buttons to perform one of two different operations. For instance, by selecting the button 36 with label, "RECORD EPISODE", the user can invoke a command to instruct the DVR to record only the current episode of the live television program that is being displayed in the active video window. Similarly, by selecting (e.g., pressing) the virtual button 38 with label, "RECORD SERIES", the user can invoke a command directing the DVR to record the entire series for the particular television program that is currently being presented in the active video window.

Figure 5:
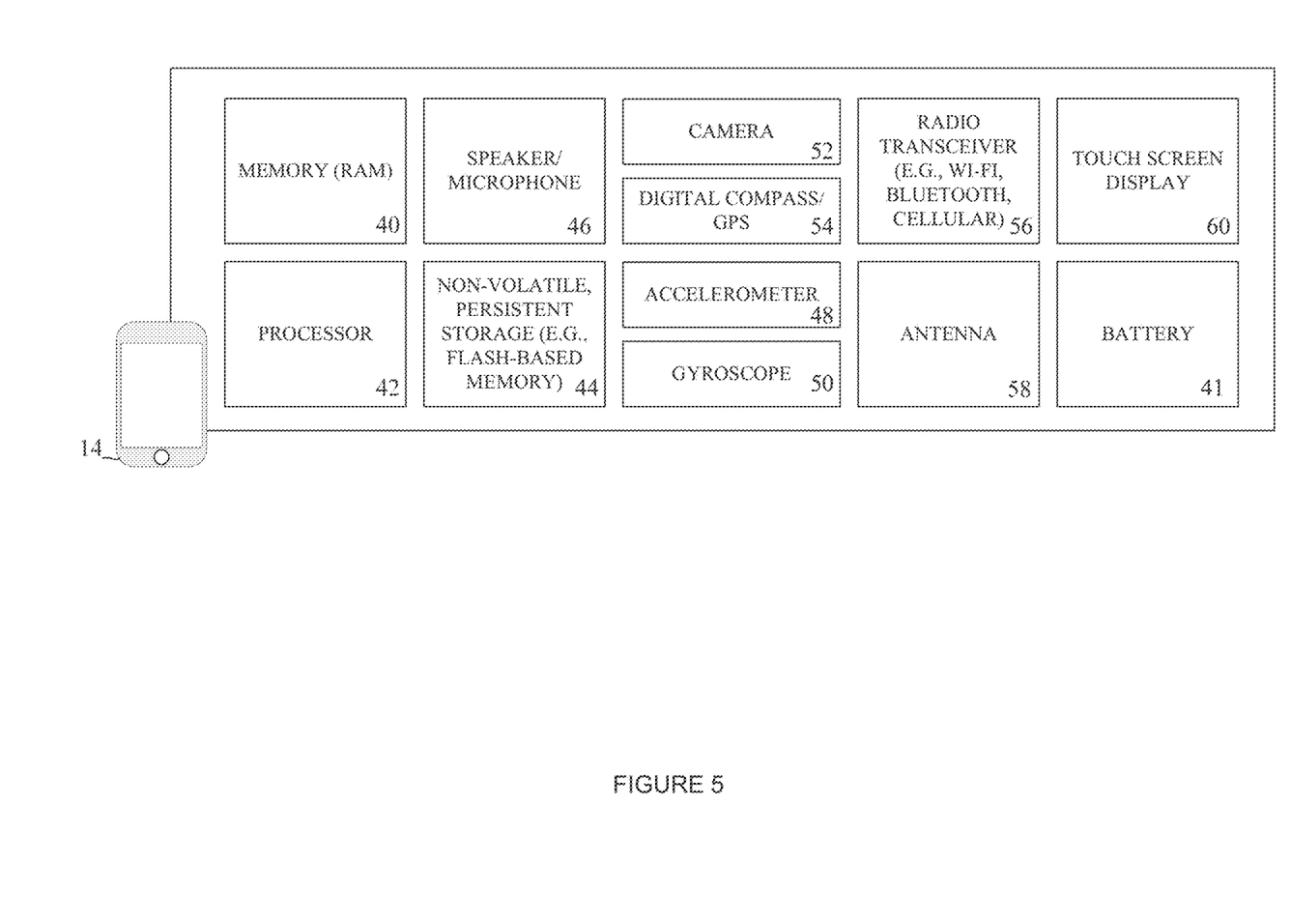
FIG. 5 illustrates an example functional block diagram of a mobile device (e.g., mobile handset or tablet computing device) within which a set of instructions, for causing the device to perform any one or more of the methodologies described herein, may be executed.
Figure 6:
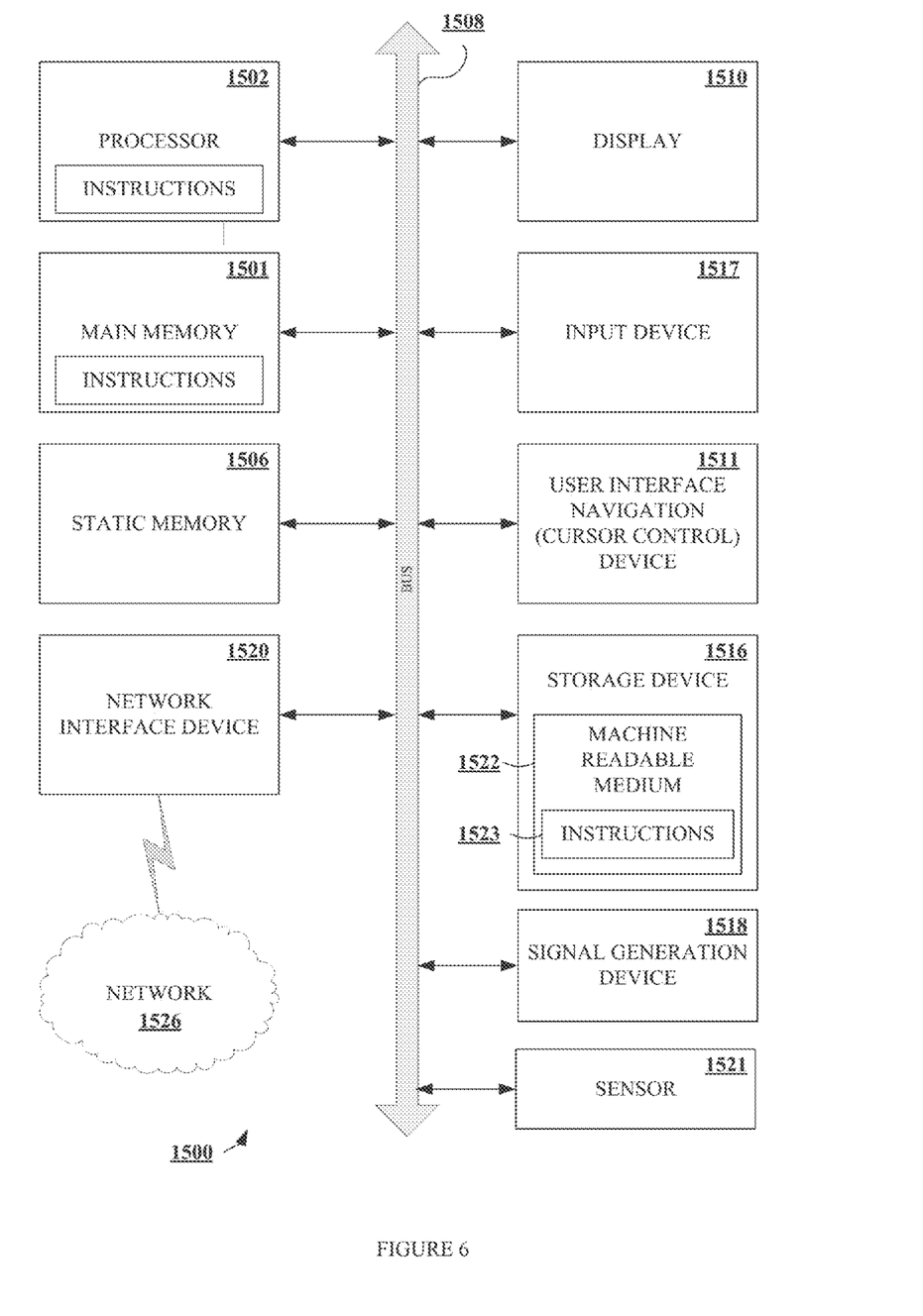
FIG. 6 is a block diagram of a machine in the form of a computer system (e.g., a media player device, content source or server, or content management server) within which a set of instructions, for causing the machine to perform any one or more of the methodologies discussed herein, may be executed.

FIG. 5 is a functional block diagram of the various functional components or modules included in a mobile computing device on which a content viewing application may be executed, consistent with some example embodiments. As illustrated in FIG. 5, the mobile computing device 14 includes a buttery 41 for powering the device 14 and its various components. In addition, the mobile computing device 14 includes a memory module (e.g., RAM) 40 and a processor 42 for storing and executing an operating system (not shown) and various software applications, including the content browsing and viewing application. In particular, the processor 42 and memory 40 are used to store and execute instructions that comprise the content viewing application. The content viewing application, when executed, receives and processes content, such as audio and video streams, to present or display content. In some embodiments, the content viewing application will utilize one or more application programming interfaces (API's) supported by the mobile device's operating system. In addition, the mobile computing device 14 of FIG. 5 includes a non-volatile, persistent storage module 44, such as a flash-based memory drive for storing software applications, application configuration settings, and other digital content.

As illustrated in FIG. 5, the mobile computing device 14 includes a speaker and microphone 46 for use in presenting audio and video content. In some embodiments, the microphone 46 may be used to sense audible spoken commands. The mobile computing device also includes an accelerometer 48 and a gyroscope 50. The accelerometer 28 and gyroscope 30 may be used to detect changes in the orientation of the mobile computing device 10, and thereby trigger manipulations to the user interface.

In addition, the mobile computing device 14 includes a touch screen display 40 for displaying content and various graphical user interface elements, and sensing the position of an user's touch on the display screen. Accordingly, a user may perform certain gestures (e.g., such as finger swipes) to manipulate the UI, and in particular browse content in the content carousels. In addition, the touch screen display is used to sense the dragging and dropping of one user interface element onto another, thereby invoking various commands.

Consistent with some embodiments, the mobile computing device 14 includes one or more radio transceiver modules 56 and one or more antennas 58 for sending and receiving wireless data communications. For example the radio transceiver module 56 may facilitate voice and/or data communications over a wireless telephone network, a wireless data network (e.g., Wi-Fi® or IEEE 802 compatible network), or a Bluetooth® network.

Although not shown in FIG. 5, the mobile computing device may include an infrared port for communicating commands via an infrared signal to nearby hardware devices. For instance, with some embodiments, upon detecting a drag and drop action, the content viewing application may invoke a command that is communicated via an IR port to a set top box, television, or other hardware device capable of receiving and processing commands via infrared.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

FIG. 7 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium." shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

The invention claimed is:

1. A method comprising:
   detecting, by one or more processors of a machine, a drag-and-drop event that indicates a displayed first graphical element being moved from a group of displayed first graphical elements and positioned over a displayed second graphical element in a group of displayed second graphical elements that indicate available recipient users, the displayed first graphical element identifying selected content to be shared with a selected available recipient user indicated by the displayed second graphical element, the displayed second graphical element being associated with configuration settings that specify a media device among multiple media devices of the selected available recipient user, designate the media device to obtain shared content, and specify whether the designated media device is to obtain the shared content by retrieval of the shared content or by being provided the shared content;
   responsive to the drag-and-drop event, by the one or more processors of the machine, generating and communicating a command via a network to the designated media device of the selected available recipient user, the command being generated based on the configuration settings and identifying the selected content to be shared and the associated selected available recipient user with whom the selected content is to be shared; and wherein, based on the configuration settings specifying that the designated media device is to obtain the shared content by retrieval of the shared content, the communicated command is executed by the designated media device in accordance with the configuration settings to obtain the selected content by retrieval of the selected content; and
   communicating a notification that indicates the generated command was executed by the designated media device.

2. The method of claim 1, wherein:
   the notification indicates whether the generated command was successfully executed.

3. The method of claim 2, wherein:
the media device specified in the configuration settings associated with the second graphical element includes a first media, device designated to access shared content;
the configuration settings associated with the second graphical element specify a second media device to receive notifications associated with shared content; and the method further comprises:
causing the second media device to receive the notification based on the second media device being specified in the configuration settings.

4. The method of claim 2, wherein:
the media device specified in the configuration settings associated with the second graphical element includes a first media device designated to access shared content; and
the communicating of the notification includes providing the notification to the machine that performed the generating and communicating of the command.

5. The method of claim 1, wherein:
the media device specified in the configuration settings associated with the second graphical element includes a first media device designated to access shared content; and
the configuration settings of the second graphical element specify a second media device to receive a notification that the content has become accessible by the first media device.

6. The method of claim 1, wherein:
the configuration settings associated with the second graphical element specify that shared content is to be downloaded to the specified media device designated to access shared content; and
the communicating of the generated command causes the content to be downloaded to the media device specified in the configuration settings associated with the second graphical element.

7. The method of claim 1, wherein:
the configuration settings associated with the second graphical element specify that a link to shared content is to be communicated to the specified media device designated access shared content; and
the communicating of the generated command causes a link to the content represented by the first graphical element to be communicated to the media device specified in the configuration settings associated with the second graphical element.

8. A device comprising:
a touch screen display;
one or more processors; and
a memory storing instructions that, when executed by the one or more processors, cause the one or more processors to perform operations comprising:
via the touch screen display, detecting a drag-and-drop event that indicates a displayed first graphical element being moved from a group of displayed first graphical elements and positioned over a displayed second graphical element in a group of displayed second graphical elements that indicate available recipient users, the displayed first graphical element identifying selected content to be shared with a selected available recipient user indicated by the displayed second graphical element, the displayed second graphical element being associated with configuration settings that specify a media device among multiple media devices of the selected available recipient user, designate the media device to obtain shared content, and specify whether the designated media device is to obtain the shared content by retrieval of the shared content or by being provided the shared content;
responsive to the drag-and-drop event, generating and communicating a command via a network to the designated media device of the selected available recipient user, the command being generated based on the configuration settings and identifying the selected content to be shared and the associated selected available recipient user with whom the selected content is to be shared; and
wherein, based on the configuration settings specifying that the designated media device is to obtain the shared content by retrieval of the shared content, the communicated command is executed by the designated media device in accordance with the configuration settings to obtain the selected content by retrieval of the selected content; and
communicating a notification that indicates the generated command was executed by the designated media device.

9. The device of claim 8, wherein:
the notification indicates whether the generated command was successfully executed.

10. The device of claim 9, wherein:
the media device specified in the configuration settings associated with the second graphical element includes a first media device designated to access shared content;
the configuration settings associated with the second graphical element specify a media second device to receive notifications associated with shared content; and the operations further comprise:
causing the second media device to receive the notification based on the second media device being specified in the configuration settings.

11. The device of claim 9, wherein:
the media device specified in the configuration settings associated with the second graphical element includes a first media device designated to access shared content; and
the communicating of the notification includes providing the notification to the device that performed the generating and communicating of the command.

12. The device of claim 8, wherein:
the media device specified in the configuration settings associated with the second graphical element includes a first media device designated to access shared content; and
the configuration settings associated with the second graphical element specify a second media device to receive a notification that the content has become accessible by the first media device.

13. A non-transitory machine-readable storage medium comprising instructions that, when executed by one or more processors of a machine, cause the machine to perform operations comprising:
detecting a drag-and-drop event that indicates a displayed first graphical element being moved from a group of displayed first graphical elements and positioned over a displayed second graphical element in a group of displayed second graphical elements that indicate available recipient users, the displayed first graphical element identifying selected content to be shared with a selected available recipient user indicated by the displayed second graphical element, the displayed second graphical element being associated with configuration settings that specify a media device among multiple media devices of the selected available recipient user, designate the media device to obtain shared content, and specify whether the designated media device is to obtain the shared content by retrieval of the shared content or by being provided the shared content; and responsive to the drag-and-drop event, generating and communicating a command via a network to the designated media device of the selected available recipient user, the command being generated based on the configuration settings and identifying the selected content to be shared and the associated selected available recipient user with whom the selected content is to be shared; and wherein, based on the configuration settings specifying that the designated media device is to obtain the shared content by retrieval of the shared content, the communicated command is executed by the designated media device in accordance with the configuration settings to obtain the selected content by retrieval of the selected content; and communicating a notification that indicates the generated command was executed by the designated media device.

14. The non-transitory machine-readable storage medium of claim 13, wherein:

the notification indicates whether the generated command was successfully executed.

15. The non-transitory machine-readable storage medium of claim 13, wherein:

the communicated command causes the designated media device to present the obtained content.

* * * * *

UNITED STATES PATENT AND TRADEMARK OFFICE
CERTIFICATE OF CORRECTION

PATENT NO. : 10,104,135 B2
APPLICATION NO. : 14/798173
DATED : October 16, 2018
INVENTOR(S) : Chai et al.

Page 1 of 1

It is certified that error appears in the above-identified patent and that said Letters Patent is hereby corrected as shown below:

In the Claims

In Column 13, Line 4, in Claim 3, delete "media," and insert --media-- therefor

Signed and Sealed this
Twenty-first Day of April, 2020

Andrei Iancu
*Director of the United States Patent and Trademark Office*